United States Patent
Miyashita et al.

(10) Patent No.: US 8,417,680 B2
(45) Date of Patent: Apr. 9, 2013

(54) SYSTEM FOR IMPROVING ACCESS EFFICIENCY IN DATABASE AND METHOD THEREOF

(75) Inventors: Hisashi Miyashita, Tokyo (JP); Ryoh Neyama, Yokohama (JP); Yohsuke Ozawa, Fujisawa (JP); Mikio Takeuchi, Zama (JP)

(73) Assignee: International Business Machines Corporation, Armonk, NY (US)

( * ) Notice: Subject to any disclaimer, the term of this patent is extended or adjusted under 35 U.S.C. 154(b) by 0 days.

(21) Appl. No.: 12/095,780

(22) PCT Filed: Nov. 30, 2006

(86) PCT No.: PCT/JP2006/323952
§ 371 (c)(1),
(2), (4) Date: Apr. 21, 2009

(87) PCT Pub. No.: WO2007/063945
PCT Pub. Date: Jun. 7, 2007

(65) Prior Publication Data
US 2009/0307275 A1   Dec. 10, 2009

(30) Foreign Application Priority Data
Dec. 2, 2005   (JP) .................................. 2005-349718

(51) Int. Cl.
*G06F 17/30* (2006.01)
(52) U.S. Cl.
USPC ............................ 707/703; 707/684; 707/826
(58) Field of Classification Search .................. 707/703, 707/826, 999.003, 999.107, 683, 684
See application file for complete search history.

(56) References Cited

U.S. PATENT DOCUMENTS 5,897,632 A * 4/1999 Dar et al. .............................. 1/1
5,920,857 A   7/1999 Rishe
(Continued)

FOREIGN PATENT DOCUMENTS

| JP | 2001134480 | 5/2001 |
|----|------------|--------|
| JP | 2003242016 | 8/2003 |

OTHER PUBLICATIONS

Babu, et al, "Continuous Queries over Data Streams", SIGMOD Record, vol. 30, No. 3, Sep. 2001.
Chaudhuri, et al, "Optimizing Queried with Materialized Views", ICDE 1995.

(Continued)

*Primary Examiner* — Leslie Wong
(74) *Attorney, Agent, or Firm* — William Stock; Anne Vachon Dougherty (57) ABSTRACT

A system and method for improving access efficiency in a database. The database stores values of a plurality of keys associated with the respective keys. The system of the invention executes a plurality of transactions on the database, and acquires and records a referenced value which is a value of a key referenced in a corresponding transaction from the database according to the execution of each of the transactions. Then, according to commit requests of the plurality of transactions, the system requests a reply of a resultant table including an arrangement of judgment results obtained by judging whether the value of the key stored in the database is maintained as the referenced value without change made by another transaction for the respective transactions. The system further judges whether each transaction is successful, based on the resultant table sent back and commits only transactions judged to be successful.

20 Claims, 11 Drawing Sheets

U.S. PATENT DOCUMENTS

| | | | | |
|---|---|---|---|---|
| 6,513,056 | B1* | 1/2003 | Copeland et al. | 718/101 |
| 6,567,928 | B1* | 5/2003 | Lyle et al. | 714/15 |
| 6,631,374 | B1* | 10/2003 | Klein et al. | 707/638 |
| 6,873,995 | B2* | 3/2005 | Benson et al. | 707/607 |
| 7,181,479 | B2* | 2/2007 | Suzuki et al. | 707/615 |
| 2003/0200212 | A1* | 10/2003 | Benson et al. | 707/7 |
| 2004/0015851 | A1* | 1/2004 | Newhook et al. | 717/116 |

OTHER PUBLICATIONS

Jin, et al, "Framework to Support Multiple Query Optimization for Complex Mining Tasks", ACM Transactions on Database Systems, vol. 13, No. 1, Mar. 1988, pp. 23-32.

\* cited by examiner

```
 1: SELECT 101  COUNT(*)  WHERE KEY=1001  VALUE=100
 2: UNION ALL
 3: SELECT 101  COUNT(*)  WHERE KEY=1003  VALUE=120
 4: UNION ALL
 5: SELECT 102  COUNT(*)  WHERE KEY=1004  VALUE=130
 6: UNION ALL
 7: SELECT 103  COUNT(*)  WHERE KEY=2001  VALUE=140
 8: UNION ALL
    ...
 n: UNION ALL
n+1: SELECT 103  COUNT(*)  WHERE KEY=2004  VALUE=110
n+2:                                       FROM table1
```

```
1:   SELECT 1  COUNT(*)  WHERE KEY=1001   VALUE=100
2:   UNION ALL
3:   SELECT 2  COUNT(*)  WHERE KEY=1003   VALUE=120
4:   UNION ALL
5:   SELECT 3  COUNT(*)  WHERE KEY=1004   VALUE=130
6:   UNION ALL
7:   SELECT 4  COUNT(*)  WHERE KEY=2001   VALUE=140
8:   UNION ALL
     :   :
n:   UNION ALL
n+1: SELECT n  COUNT(*)  WHERE KEY=2004   VALUE=110
n+2:                                      FROM table1
```

FIG. 9

| DEFAULT IDENTIFICATION INFORMATION | TRANSACTION ID |
|---|---|
| 1 | 101 |
| 2 | 101 |
| 3 | 102 |
| 4 | 103 |
| ⋮ | ⋮ |
| n | 103 |

SYSTEM FOR IMPROVING ACCESS EFFICIENCY IN DATABASE AND METHOD THEREOF

TECHNICAL FIELD

The present invention relates to a system for controlling an access to a database and a method thereof. Particularly the present invention relates to a system for controlling the timing of a commit process in a database.

BACKGROUND ART

In recent years, with the widespread of a communication network and an information-processing apparatus, the importance of database apparatuses increasingly rises up. For example, a database apparatus constitutes an information system together with a web server apparatus or an application server apparatus so as to be used for customer management or settlement process of e-commerce. Moreover, it becomes possible to control the database apparatuses not only in the structured query language (SQL) or other query languages, but also in the Java® language using Java® database connectivity (JDBC). Therefore, the database apparatuses have high compatibility with various application programs developed using the Java® language (Java® is a registered trademark).

Conventionally, there has been performed a transaction (an optimistic transaction) without exclusive control as a method of improving access efficiency in a database with a few access competitions. According to the optimistic transaction, there is no need to perform exclusive control for each data access in the transaction and therefore it is possible to improve the efficiency of accesses to database apparatuses.

However, when the optimistic transaction is performed, there is required a process as referred to as a verification in order to maintain matching of a database. The verification is a process for confirming that data referenced in the optimistic transaction has not been changed from the referenced value even when the data referenced in the optimistic transaction commits the processing matter of the transaction. A database apparatus commits the processing matter of the transaction on condition that the referenced data has not been changed, and does a rollback of the transaction if the data has been changed.

A technique for improving access efficiency in a database apparatus will be described below as a reference technique.

Conventionally, there has been suggested a technique for converting a query to a database to another efficient query by rewriting the query within a range of not changing the meaning of the query and sending the query to the database apparatus in response to the query to the database (refer to Nonpatent Document 1). This document, however, merely describes a general concept of improving the query to the database. For example, the document does not describe a concrete method of improving an efficiency of a plurality of transactions whose execution sequence is dynamically defined. In addition, the document does not describe a concrete method of optimizing a query using SQL. As an application of this technique, Patent Document 1 describes a technique for optimizing a plurality of commands sequentially issued. A technique described in Patent Document 1, however, is based on the premise of a database for managing data using a particular tree structure and an access to the database requires a particular query language. A technique described in Nonpatent Document 3 is also based on the premise of a particular query language and it is difficult to apply the technique to a database that is typical today. Moreover, Nonpatent Document 2 suggests a technique for caching a query result of a database on a storage device. The efficiency, however, is improved by the technique only when the same key is accessed in succession and thus it is impossible to improve the efficiency of a plurality of queries for which different keys are accessed.

Patent Document 1: U.S. Pat. No. 5,920,857 Efficient optimistic concurrency control and lazy queries for B-trees and other database structures.

Nonpatent Document 1: Timos K. Sellis, Multiple-Query Optimization, ACM Transactions on Database Systems, Vol. 13, No. 1, March 1988, Pages 23-52

Nonpatent Document 2: Surajit Chaudhuri, Ravi Krishnamurthy, Spyros Potamianos and Kyuseok Shim, Optimizing Queries with Materialized Views, ICDE 95

Nonpatent Document 3: Shivnath Babu and Jennifer Widom, Continuous Queries over Data Streams, SIGMOD Record, Vol. 30, No. 3, September 2001, Pages 109-120

DISCLOSURE OF THE INVENTION

Problems to be Solved by the Invention

The verification is specifically a process in which an application server apparatus or the like accesses a database apparatus to acquire data and compares the acquired data with data referenced in the optimistic transaction. Therefore, an access to the database apparatus is required in order to realize the process. When the number of times of accesses to the database apparatus increases, however, communication time between the database apparatus and the application server apparatus increases and, thus, it is concerned that the efficiency of the whole process falls down.

Therefore, when the verification is performed in a mass for transactions as many as possible, it is considered that the efficiency of the verification rises. When the verification is performed for a plurality of transactions in a mass without consideration for transaction boundaries, however, it is necessary to do a rollback of all these transactions even if only verification of one of the transactions is unsuccessful and thus the efficiency goes down.

Therefore, it is an object of the present invention to provide a system, method, and program capable of solving the above problems. This object is achieved by the combination of features of the independent claims in the appended claims. The dependent claims define further advantageous embodiments of the present invention.

Means for Solving the Problems

To solve the above problems, according to the present invention, there are provided a system for controlling an access to a database which stores values of a plurality of keys associated with the respective keys, comprising: an executing section which executes a plurality of transactions on the database; a reference recording section which acquires and records, according to the execution of each of the transactions, a referenced value which is a value of a key referenced in the executed transaction from the database; a reply requesting section which requests, according to commit requests of the plurality of transactions, a reply of a resultant table including an arrangement of judgment results obtained by judging whether the value of the key stored in the database is maintained as the referenced value without change made by another transaction for the respective transactions; a judging section which judges that the transaction is successful on condition that the value of the key referenced in the transaction is maintained as the referenced value without change made by another transaction, with respect to each of the transactions, based on the resultant table sent back; and a processing section which commits the transactions judged to be successful and does a rollback of the transactions judged to be unsuccessful, a method of access control to the database using the system, and a program which causes an information processor to function as the system.

The above summary of the invention does not necessarily describe all necessary features and the invention may also be a sub-combination of these described features.

Effect of the Invention

According to the present invention, it is possible to further improve the efficiency of access to a database than before.

BEST MODE FOR CARRYING OUT THE INVENTION

Although the present invention will be described hereinafter by way of embodiments, the following embodiments do not limit the invention according to claims and all combinations of the features described in the embodiments are not necessarily essential to means for solving the problems of the invention.

Figure 1:
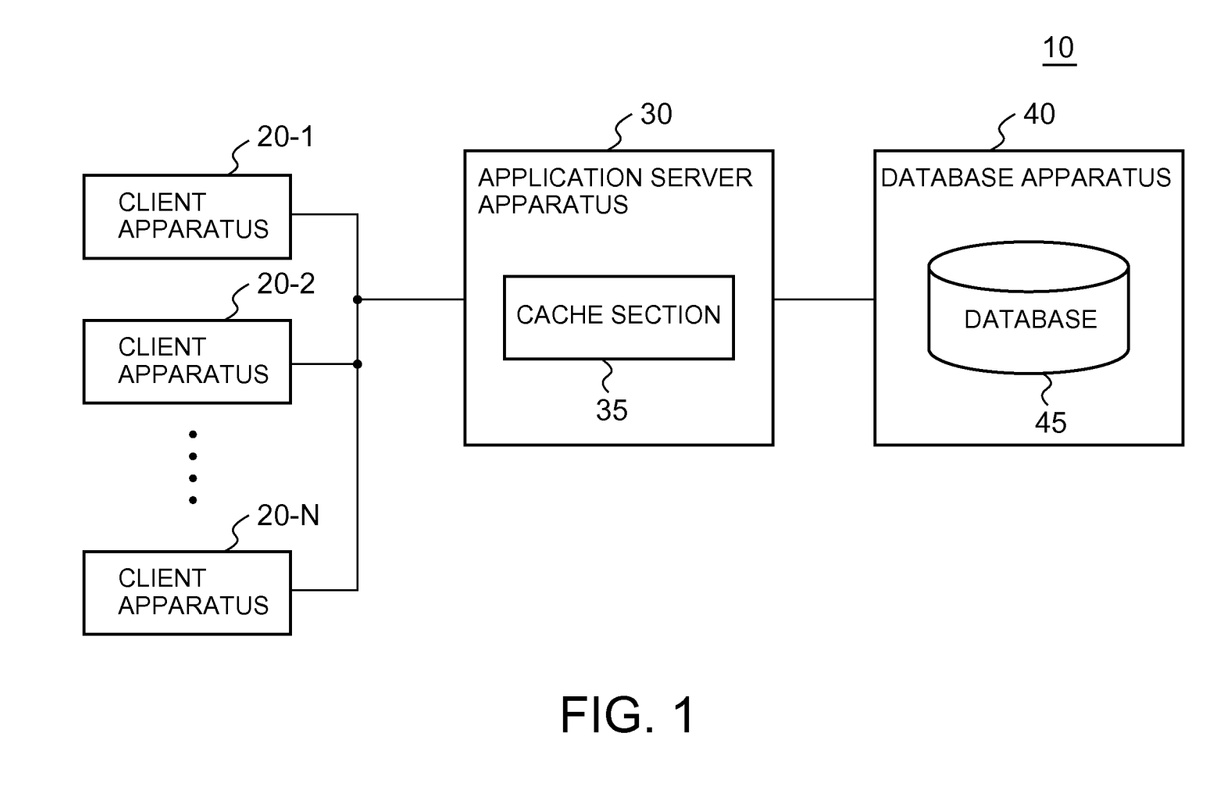
FIG. 1 is a diagram illustrating a general configuration of an access control system 10.

FIG. 1 shows a general configuration of an access control system 10. The access control system 10 includes client apparatuses 20-1 to 20-N, an application server apparatus 30, and a database apparatus 40. The client apparatuses 20-1 to 20-N are provided so as to correspond to different users, respectively, and send a command to the application server apparatus 30 in response to a user's operation. The command may be described in a query language such as, for example, SQL. The application server apparatus 30 acquires data from a database 45 in the database apparatus 40 in response to the received command and stores the data into a cache section 35. Then, the application server apparatus 30 updates the data in the cache section 35 in response to sequentially received commands. The application server apparatus 30 causes the content stored in the cache section 35 to be reflected on the database 45 in response to the reception of commit requests from the client apparatuses 20-1 to 20-N. If the transaction fails, the application server apparatus 30 invalidates the content stored in the cache section 35 and notifies the client apparatuses 20-1 to 20-N as such (rollback process). The database 45 stores the values of a plurality of keys with being associated with the respective keys, and the database apparatus 40 sends back a value of a key specified by the application server apparatus 30 to the application server apparatus 30.

When there are only a few competing accesses to the same key, it is efficient to use a system of performing a transaction without locking the key in the database 45 and determining the matching of the database at the commitment. This type of transaction is referred to as an optimistic transaction system.

Figure 2:
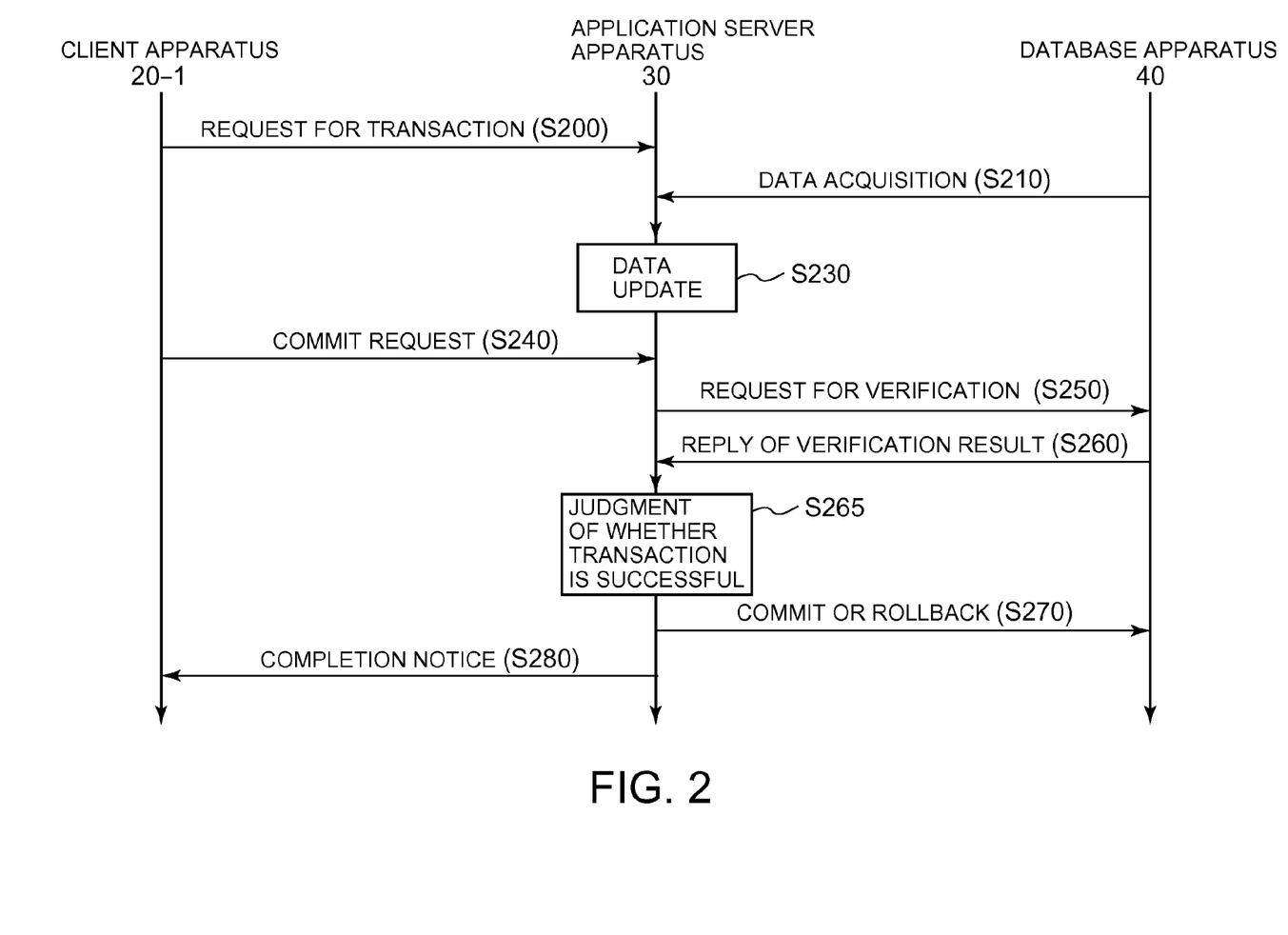
FIG. 2 is a diagram illustrating an outline of an optimistic transaction process.

FIG. 2 shows an outline of the optimistic transaction process.

The client apparatus 20-1 sends a request for performing a transaction to the application server apparatus 30 (S200). The application server apparatus 30 acquires the value of the key from the database apparatus 40 in response to the request (S210). The application server apparatus 30 stores the acquired data into the cache section 35 and updates the value in response to requests sequentially received thereafter (S230). In doing so, the application server apparatus 30 separately records the value of the key before update, which is to be updated.

Upon receiving the commit request from the client apparatus 20-1 (S240), the application server apparatus 30 sends a request for verification to send an inquiry concerning whether the value of the key subjected to the update is maintained as the value before update without change to the database apparatus 40 (S250). The application server apparatus 30 receives a reply of the verification result (S260). The application server apparatus 30 judges whether the transaction is successful based on the result (S265). If the transaction is successful, the application server apparatus 30 commits the transaction (S270). If the transaction is unsuccessful, the application server apparatus 30 does a rollback of the transaction. The application server apparatus 30 sends back a completion notice of the commit or rollback to the client apparatus 20-1 (S280).

Although no communication to the database apparatus 40 occurs during the progress of the transaction in the above optimistic transaction, the communication to the database apparatus 40 occurs during the verification. The access control system 10 according to this embodiment intends to improve the efficiency of the whole access control system 10 by decreasing the number of accesses to the database apparatus 40 required by the verification.

Figure 3:
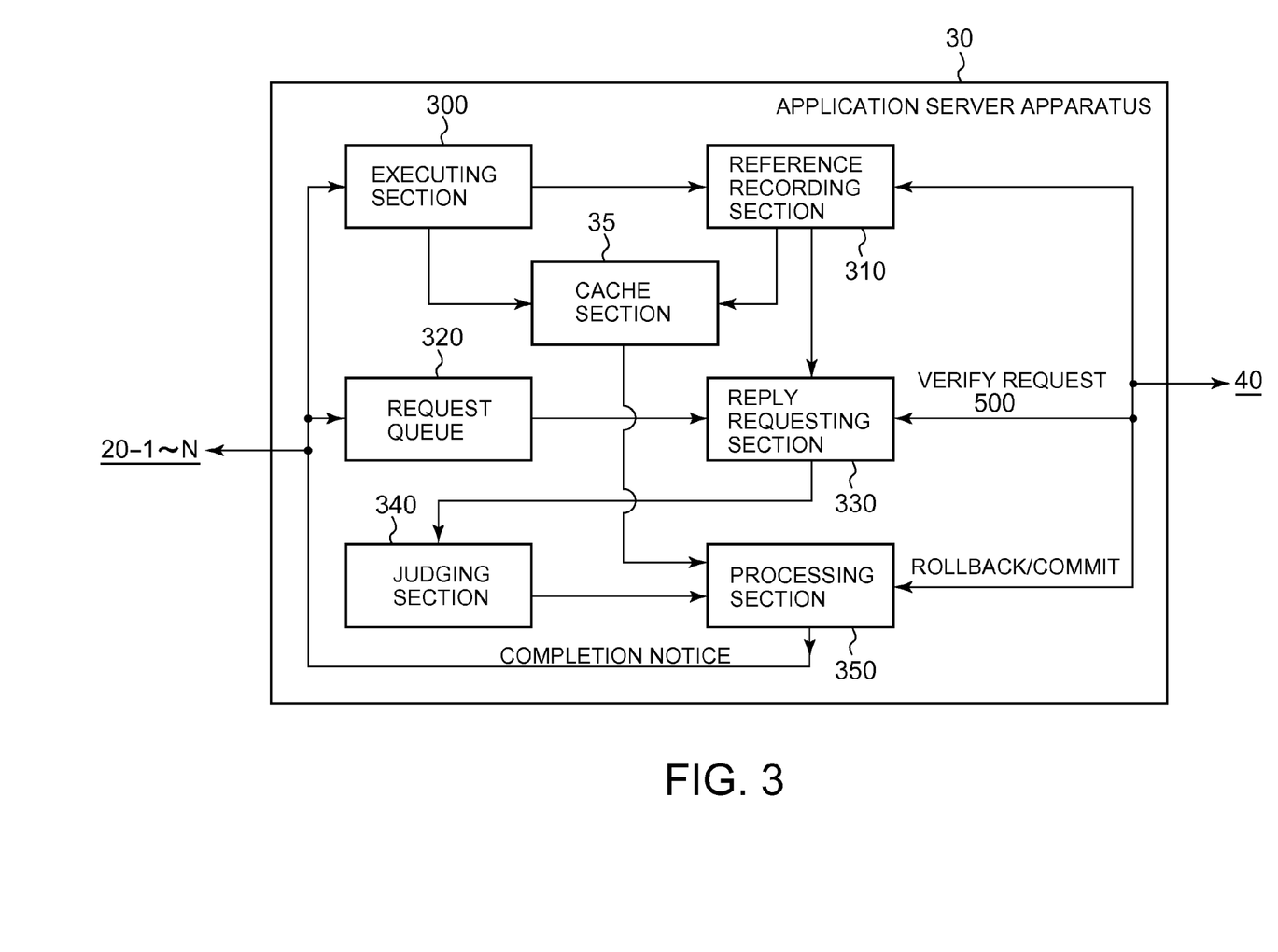
FIG. 3 is a diagram illustrating a functional configuration of the application server apparatus 30.

FIG. 3 shows a functional configuration of the application server apparatus 30. The application server apparatus 30 includes the cache section 35, an executing section 300, a reference recording section 310, a request queue 320, a reply requesting section 330, a judging section 340, and a processing section 350. The executing section 300 executes a plurality of transactions on the database 45 in response to requests for transactions sequentially received from the client apparatuses 20-1 to 20-N. Specifically, the executing section 300 judges whether a value of a key to be accessed in the requested transaction has already been stored in the cache section 35. Unless the value of the key has been stored in the cache section 35, the executing section 300 instructs the reference recording section 310 to acquire the value from the database 45 and to store the value into the cache section 35. Thereafter, the executing section 300 updates the value of the key stored in the cache section 35 by processing the requested transaction.

The reference recording section 310 acquires a referenced value which is the value of the key referenced in the transaction from the database 45 and records the referenced value, in response to the execution of each transaction. Furthermore, the reference recording section 310 stores the referenced value acquired from the database 45 into the cache section 35. The referenced value is a value before the transaction process of the key to be referenced in the transaction.

The request queue 320 sequentially receives requests for committing the transactions (hereinafter, referred to as commit requests) with respect to the plurality of transactions and stores the commit requests with maintaining the reception order of the commit requests. The reply requesting section 330 performs the processing described below, for example, regularly or on condition that the number of received commit requests exceeds a predetermined standard. The reply requesting section 330 acquires the commit requests of the plurality of transactions from the request queue 320. The reply requesting section 330 then performs the verification in a mass for the plurality of transactions to be committed by one request to the database apparatus 40 in response to these commit requests. Specifically, the reply requesting section 330 requests the database apparatus 40 to send back a resultant table including an arrangement of judgment results, each of which is obtained by judging whether the value of the key stored in the database 45 is maintained as the referenced value without change made by another transaction, for the corresponding transactions. Hereinafter, the request is referred to as verify request 500. The reply requesting section 330 receives the reply sent back in response to the request as the resultant table.

The judging section 340 judges whether the values of all keys referenced in the transactions are maintained as the referenced values without change made by another transaction with respect to each of the transactions based on the resultant table sent back. The judging section 340 judges that the transactions are successful on condition that the values of all the keys referenced in the transactions are maintained as the referenced values as the referenced values without change with respect to each of the transactions. The processing section 350 commits the transactions judged to be successful. Specifically, the processing section 350 reads out the values of the keys stored in the cache section 35 and sends the values to the database apparatus 40 so that the database 45 reflects the values. On the other hand, the processing section 350 does a rollback of the transactions judged to be unsuccessful. The processing section 350 notifies the client apparatus, which requested the corresponding transaction, that the commit or rollback is completed.

Figure 4:
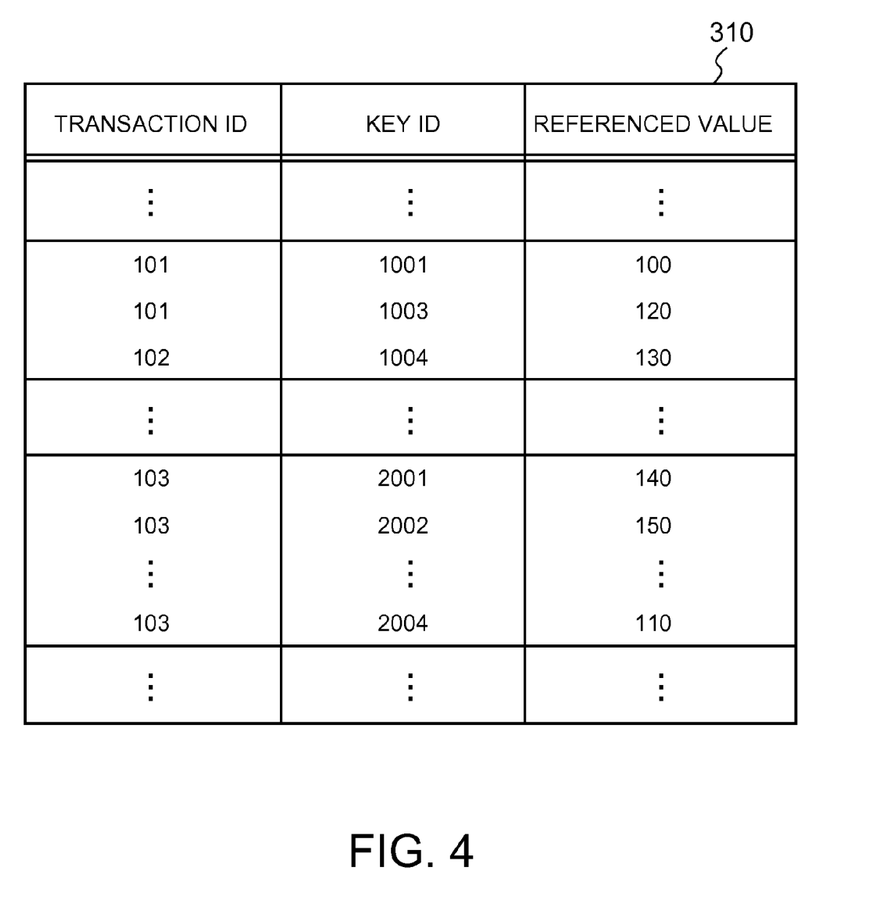
FIG. 4 is a diagram illustrating an example of a data structure of a reference recording section 310.

FIG. 4 shows an example of a data structure of the reference recording section 310. The reference recording section 310 records identification information of the key referenced in each transaction (hereinafter, referred to as key ID) and referenced value which is the value of the key referenced in the transaction, with being associated with the identification information of each transaction (hereinafter, referred to as transaction ID). The referenced value is a value that has not been updated yet in the corresponding transaction. For example, the reference recording section 310 records key ID "1001" and referenced value "100" with being associated with transaction ID "101." This means that the key having key ID "1001" was referenced in the transaction having transaction ID "101" and that the value of the key was 100 before the execution of the transaction.

The referenced value corresponding to a key is read out from the database 45 and recorded into the reference recording section 310 when the key is accessed by the transaction for the first time. The referenced value is not updated by the subsequent execution of the transaction, but used in the verification of the transaction. Specifically, the referenced value of the key is used to confirm that the key has not already been updated by another transaction at the time of committing the transaction.

Figure 5:
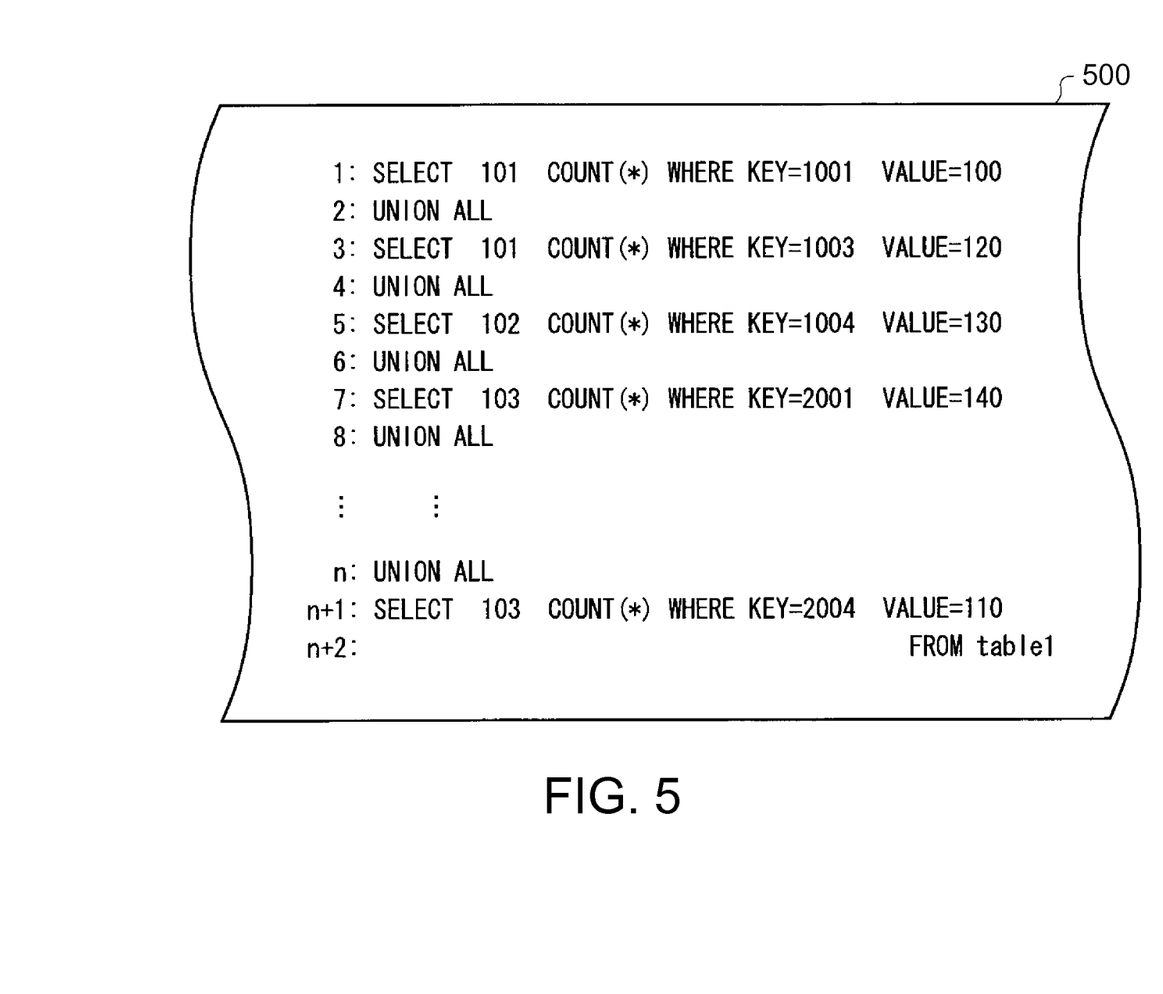
FIG. 5 is a diagram illustrating an example of a verify request 500.

FIG. 5 shows an example of the verify request 500. This drawing shows a SQL command sequence to request the resultant table including an arrangement of the verification results for the corresponding transactions, as an example of the verify request 500. In FIG. 5, table 1 indicates a table in the database 45 to be accessed in the access control system 10. This table has a key field and a value field, assuming that the key ID is stored in the key field and the value is stored in the value field.

The command in the first line in FIG. 5 is to count the number of lines having the key ID "1001" and the value "100" and to generate a line where the count value is associated with a constant "101." This command is described in SQL: the SELECT command is to select a line satisfying the condition after the WHERE clause; and the COUNT(*) command is to count the number of lines concerned.

The key ID specified by this command corresponds to the key ID recorded in the reference recording section 310. Additionally, the value specified by this command corresponds to the referenced value recorded in the reference recording section 310. In other words, the number of lines having the key ID "1001" and the value "100" indicates the judgment result obtained by judging whether the value of the key matches the referenced value. More specifically, if the number of lines is zero, the judgment result indicates a mismatch. If the number of lines is one, the judgment result indicates a match. In other words, the judging section 340 judges the transaction that has referenced a key where the number of lines matching the referenced value is one for all referenced keys by the transaction to be successful.

Moreover, the constant "101" contained in this command corresponds to the transaction ID recorded in the reference recording section 310. In other words, the command is a request for a line where the judgment result obtained by judging whether the value of the key matches the referenced value is associated with the transaction ID for referencing the key having the key ID "1001." More specifically, if the value of the key referenced in the transaction is maintained as has been referenced, a line (101, 1) is sent back. On the other hand, if the value of the key referenced in the transaction differs from the value obtained at the time of reference, a line (101, 0) is sent back.

The commands in the third, fifth, seventh, and (n+1)th lines in FIG. 5 are the same as the command in the first line. In other words, these commands are requests for judgment results obtained by judging whether the value of the key matches the referenced value, with respect to each of the keys accessed by the transactions.

The commands in the second, fourth, sixth, eighth, and nth lines in FIG. 5 correspond to a command of joining the lines of the results to the plurality of requests into a single table and sending back the table. This command is an SQL UNION ALL command. As described above, the respective lines to be joined with each other are requests for sending back the judgment result of each key and therefore the UNION ALL command plays a role as a command of joining the results of the reply requests for the judgment results into a single table and sending back the table. Thus, the verify request 500 corresponds to a command of joining and sending the results of the reply requests for the judgment results with respect to the plurality of keys on the whole.

As described hereinabove, according to the commands illustrated in FIG. 5, it is possible to request for sending back the resultant table including the arrangement of the judgment results obtained by judging whether the value of the key matches the referenced value with respect to each of the keys, with being associated with the transaction IDs for referencing the keys. This allows the verification for a plurality of transactions to be performed in a mass by one-time transmission of a command.

If the plurality of transactions to be subjected to verification upon one certain verify request 500 reference the same key, it is desirable to solve the competition of the transactions before sending the verify request 500. In other words, for example, if a transaction having the transaction ID "101" and a transaction having the transaction ID "102" reference the same key, it is impossible to commit both of the transactions. Therefore, preferably the reply requesting section 330 excludes the commands of verifying one of the transactions from the verify request 500 before sending the verify request 500 and sends the remaining commands.

Figure 6:
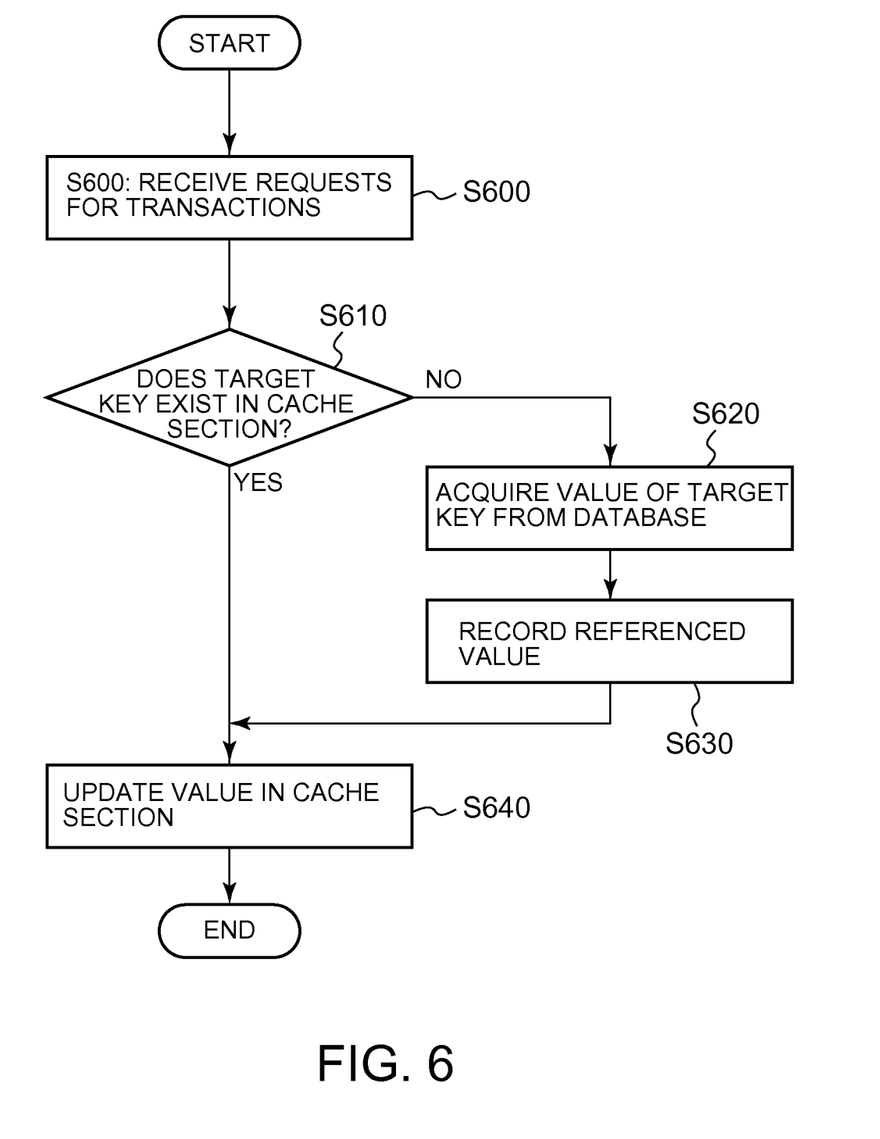
FIG. 6 is a diagram illustrating a flow of processing in response to requests for transactions.

FIG. 6 shows a flow of processing in response to requests for transactions. The executing section 300 receives the requests for transactions from the client apparatuses 20-1 to 20-N (S600). The executing section 300 may receive the request for the transaction only from one of the client apparatuses 20-1 to 20-N or may receive the requests for the transactions from the client apparatuses 20-1 to 20-N in random order. The following describes processing performed by the application server apparatus 30 in response to a request for one certain transaction.

The executing section 300 judges whether the value of the key to be accessed in this transaction has already been recorded in the cache section 35 (S610). Unless the value of the key is recorded in the cache section 35 (S610: NO), the reference recording section 310 acquires the value of the key from the database 45 and stores the value into the cache section 35 (S620). The reference recording section 310 records the acquired value as a referenced value to be accessed by the transaction (S630).

According to the record of the referenced value (S630) or if the value of the key to be accessed is recorded in the cache section 35 (S610: YES), the application server apparatus 30 proceeds to step S640. In step S640, the executing section 300 updates the value stored in the cache section 35 by executing the requested transaction. The value may be updated by this transaction or transactions sequentially performed thereafter.

As described hereinabove, according to the processing described with reference to FIG. 6, it is possible to record the value of the key to be referenced in the transaction before performing the transaction so as to use the value for the verification at the time of commitment.

Figure 7:
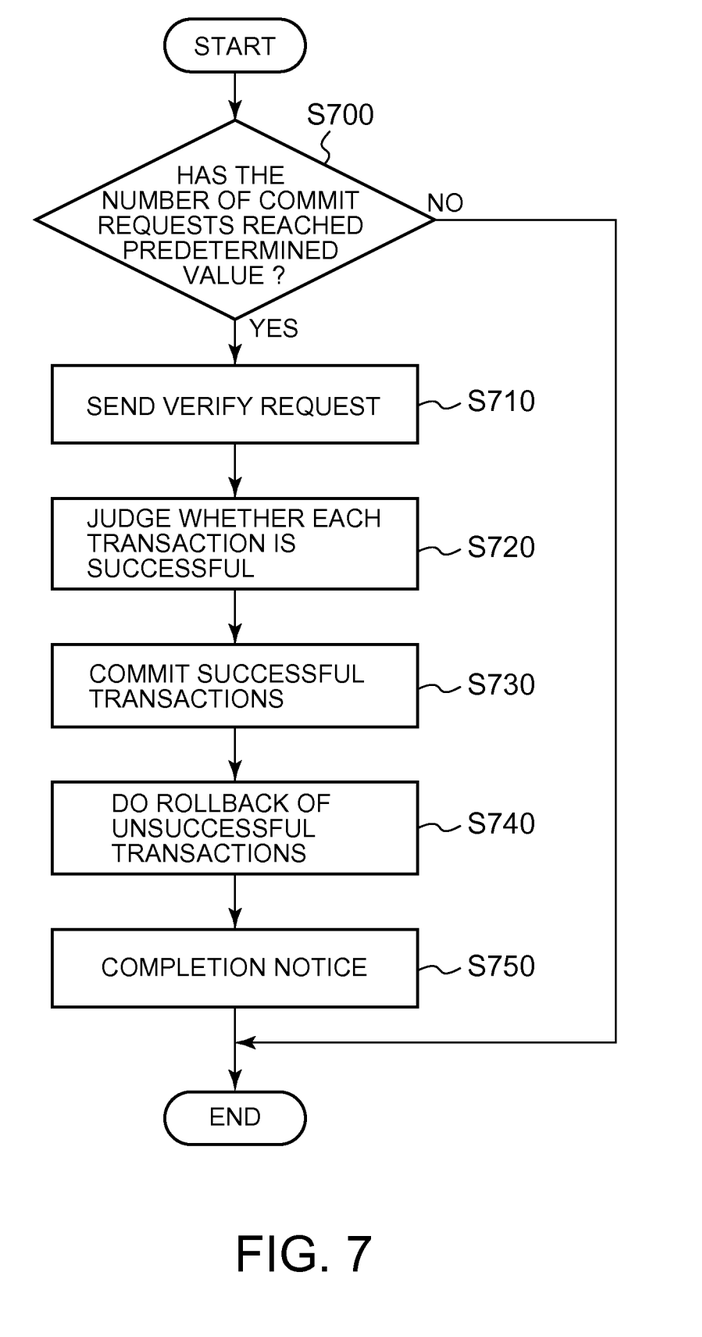
FIG. 7 is a diagram illustrating a flow of verification and a commit process.

FIG. 7 shows a flow of the verification and a commit process. The reply requesting section 330 judges whether the commit requests stored in the request queue 320 have reached the predetermined standard (S700). This standard is, for example, the number of commit requests. Alternatively, the reply requesting section 330 may judge whether a predetermined time period has elapsed after the last verification.

On condition that the commit request has reached the predetermined standard (S700: YES), the reply requesting section 330 sends the verify request 500, which is the request for performing the verification in a mass for all the commit requests stored in the request queue 320, to the database apparatus 40 (S710). Preferably, the reply requesting section 330 acquires the lock for exclusive control to the key subjected to the verification before the transmission of the verify request 500. The plurality of transactions subjected to verification may be requested by a single client apparatus such as the client apparatus 20-1 or may be requested by the client apparatuses 20-1 to 20-N, respectively. The judging section 340 judges whether each of the transactions as targets of the commit requests is successful on the basis of the resultant table which is a reply to the verify request 500 (S720).

More specifically, the judging section 340 judges that the transaction concerned is unsuccessful in the case where another transaction changes the current value of one of the keys referenced in the transactions and the current value differs from the referenced value. This is because the value has already been rewritten in another transaction and thus an access competition occurs with respect to the value. In other words, it is caused by the collapse of the premise of the optimistic transaction that the value of the referenced key does not compete with another transaction. On the other hand, the judging section 340 judges that the transaction is successful in the case where the current values of all keys referenced in the transactions are maintained as the referenced values without change made by another transaction, with respect to each of the transactions.

The processing section 350 commits the transactions judged to be successful (S730). In addition, the processing section 350 does a rollback of the transactions judged to be unsuccessful (S740). Preferably, the processing section 350 releases the lock acquired on the key to be a target of verification on condition that the commit or rollback is completed. Then, the processing section 350 notifies the client apparatus, which requested the transaction, that the transaction is successful with respect to the committed transaction (S750). On the other hand, the processing section 350 notifies the client apparatus, which requested the transaction, that the transaction is unsuccessful with respect to the rolled back transaction.

As described hereinabove, according to the embodiment described with reference to FIG. 1 to FIG. 7, it is possible to process the verification in the optimistic transaction for a plurality of transactions in a mass, thereby significantly improving access efficiency in the database apparatus 40.

Figure 8:
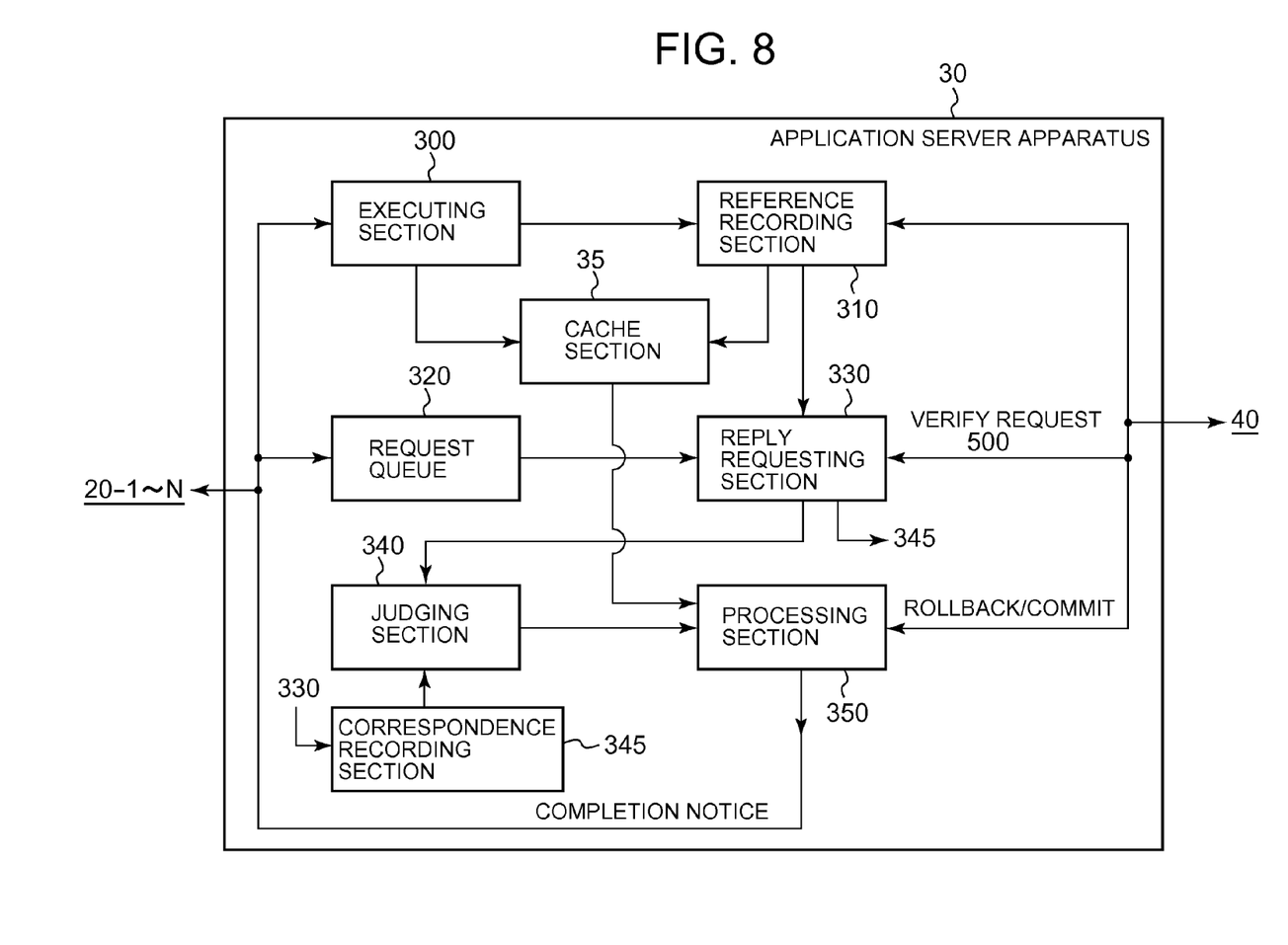
FIG. 8 is a diagram illustrating a configuration example of an application server apparatus 30 in a variation of the embodiment.

FIG. 8 shows a configuration example of the application server apparatus 30 in a variation of this embodiment. In this variation, a method of using a prepared SQL statement will be described.

It is possible to prepare a model of the verify request 500 before the verification by using the prepared statement in this variation, thus further increasing the processing efficiency at the time of verification.

The application server apparatus 30 in this variation further includes a correspondence recording section 345 in addition to the configuration shown in FIG. 3. Moreover, the judging section 340 in this variation embeds a plurality of pieces of predetermined identification information into the verify request 500 (the identification information is referred to as default identification information), instead of the transaction IDs of the transactions to be committed. The correspondence recording section 345 records correspondence information indicating which transaction has referenced the value of the key corresponding to each of the plurality of pieces of default identification information for the requested resultant table. The judging section 340 judges whether each transaction is successful or unsuccessful on the basis of both of the resultant table and the correspondence recording section 345, in response to receiving the resultant table which is a reply to the verify request 500.

Other components are substantially the same as those in FIG. 3, and therefore their description will be omitted here.

Figure 9:
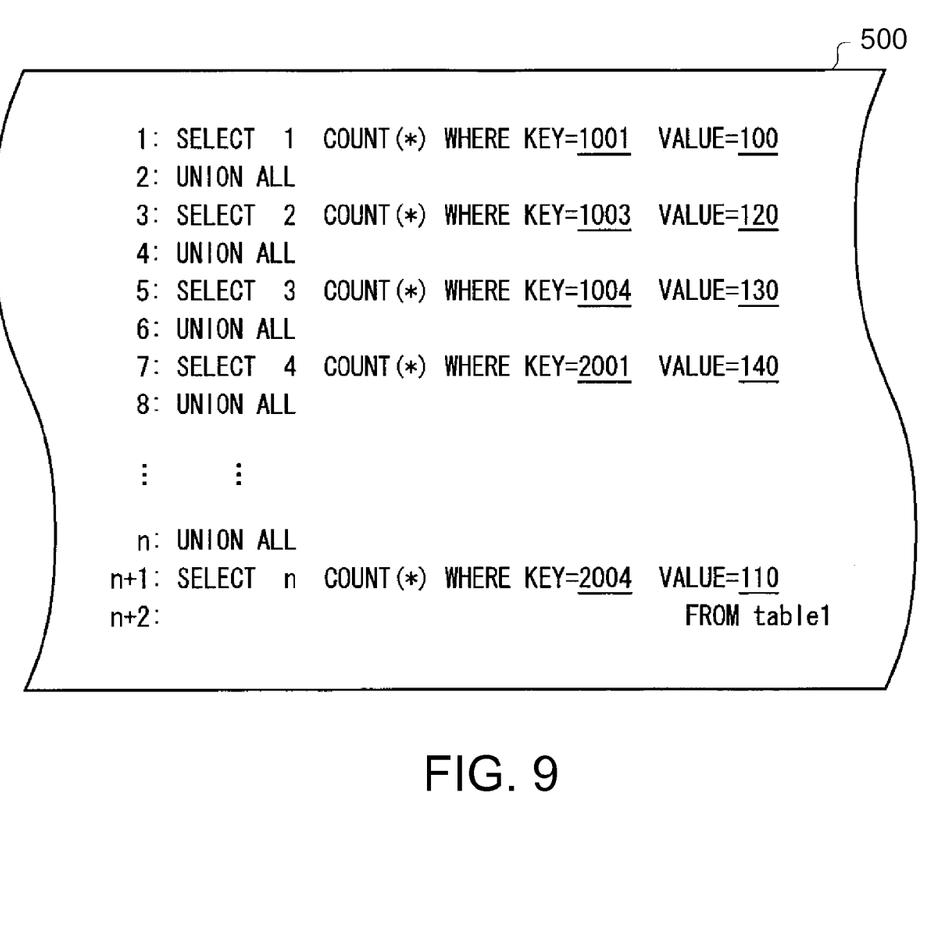
FIG. 9 is a diagram illustrating an example of the verify request 500 in the variation of the embodiment.

FIG. 9 shows an example of the verify request 500 in the variation of this embodiment. The verify request 500 in FIG. 9 is generated using the prepared statement unlike the verify request 500 in FIG. 5. The prepared statement is a model of a command sequence including a plurality of parameters to which values are assignable at the time of command execution. In the verify request 500 shown in FIG. 9, values have already been assigned to these parameters. The assigned values are indicated by underlines. Specifically, the reply requesting section 330 previously generates a model of the verify request 500 with the key ID and value used as parameters as the prepared statement before verification. Moreover, the plurality of pieces of default identification information described above are embedded in the prepared statement in advance. In the example shown in FIG. 9, the numbers 1 to n are embedded as the default identification information immediately after the respective SELECT commands.

In the verification, the reply requesting section 330 acquires the key ID and value of the key referenced in the transaction from the reference recording section 310 with respect to each of the transactions and assigns the key ID and the value to the parameters of the verify request 500. Then, the reply requesting section 330 associates the transaction ID of the transaction with the default identification information embedded in the assigned SELECT command and records the information in the correspondence recording section 345. The pair of the default identification information and the transaction ID generated in this manner will be described below with reference to FIG. 10.

Figure 10:
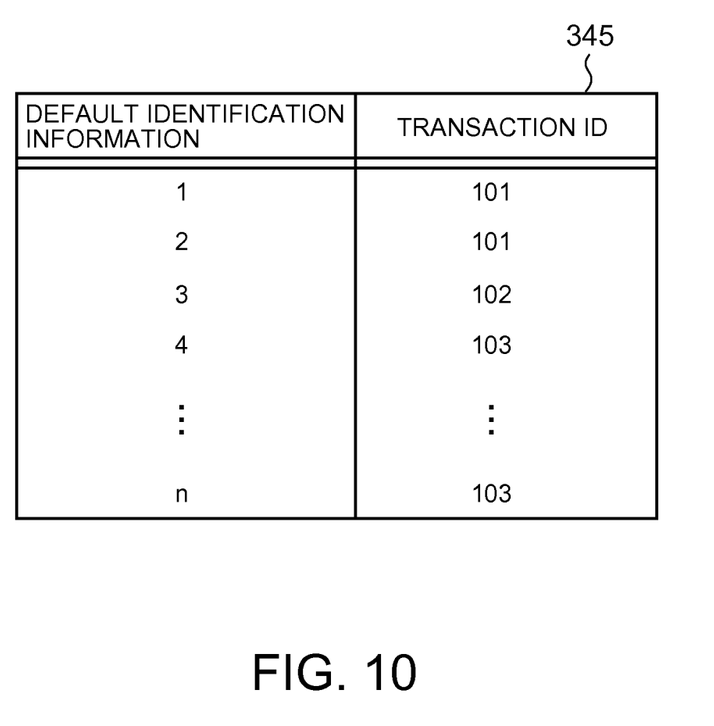
FIG. 10 is a diagram illustrating an example of a data structure of a correspondence recording section 345.

FIG. 10 shows an example of a data structure of the correspondence recording section 345. The correspondence recording section 345 records a transaction ID with being associated with each piece of the default identification information. For example, with respect to a transaction having transaction ID "101," it is assumed that the SELECT command in which the key ID and value of the key referenced in the transaction is embedded includes 1 which is default identification information. In this case, the correspondence recording section 345 records the transaction ID "101" with being associated with 1 which is the default identification information.

In this variation, the judging section 340 reads out a judgment result, which is obtained by judging that the value of the key referenced in each transaction is maintained as has been referenced without updating, from the resultant table. Then, the judging section 340 judges the respective judgment results in the resultant table as the judgment result of the transaction associated in this correspondence information with the default identification information associated with the judgment result. In the example shown in FIG. 9 and FIG. 10, specifically the judging section 340 judges the judgment result associated with 1 of the default identification information in the resultant table as a judgment result of the transaction having the transaction ID "101."

As described hereinabove, according to the variation, it is possible to process the verification in a mass for a plurality of transactions similarly to the generation of the verify request 500 for each verification even in the case of using the prepared statement, thereby increasing the access efficiency in the database. Furthermore, according to the prepared statement, it is possible to prepare most of the command sequence in advance without a need for generating a command sequence every time the verification is performed, thereby improving the efficiency.

Figure 11:
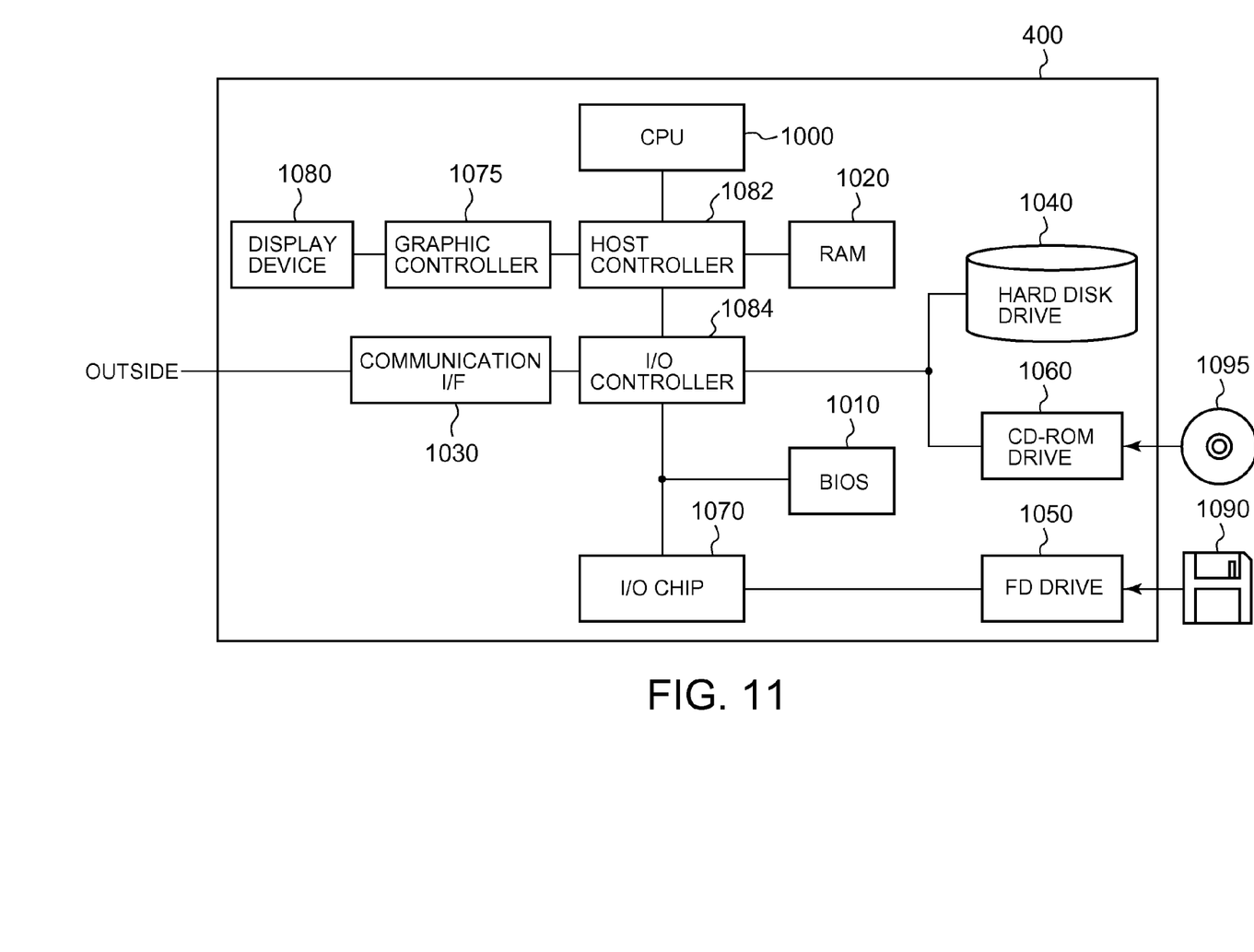
FIG. 11 is a diagram illustrating an example of a hardware configuration of an information processor 400 which functions as the application server apparatus 30 in the embodiment and variation described above.

FIG. 11 shows an example of a hardware configuration of an information processor 400 which functions as the application server apparatus 30 in the above embodiment and variation. The information processor 400 includes a CPU peripheral section having a CPU 1000, a RAM 1020, and a graphic controller 1075, which are connected to each other by a host controller 1082, an I/O section having a communication interface 1030, a hard disk drive 1040, and a CD-ROM drive 1060, which are connected to the host controller 1082 via an I/O controller 1084, and a legacy I/O section having a BIOS 1010, a flexible disk drive 1050, and an I/O chip 1070, which are connected to the I/O controller 1084.

The host controller 1082 connects the RAM 1020 to the CPU 1000 and the graphic controller 1075 which access the RAM 1020 at high transfer rate. The CPU 1000 operates based on programs stored in the BIOS 1010 and the RAM 1020 to control respective sections. The graphic controller 1075 acquires image data generated on a frame buffer provided in the RAM 1020 by the CPU 1000 and controls the display device 1080 to display the image data. Alternatively, the graphic controller 1075 may include inside the frame buffer for storing the image data generated by the CPU 1000.

The I/O controller 1084 connects the host controller 1082 to the communication interface 1030, the hard disk drive 1040, and the CD-ROM drive 1060, which are relatively high-speed I/O devices. The communication interface 1030 communicates with external devices via a network. The hard disk drive 1040 stores programs and data used by the information processor 400. The CD-ROM drive 1060 reads a program or data from a CD-ROM 1095 and provides the RAM 1020 or the hard disk drive 1040 with the program or data.

The I/O controller 1084 is connected to the BIOS 1010, the flexible disk drive 1050, the I/O chip 1070, and the like, which are relatively low-speed I/O devices. The BIOS 1010 stores a boot program executed by the CPU 1000 on startup of the information processor 400 and programs that depend on the hardware of the information processor 400. The flexible disk drive 1050 reads a program or data from a flexible disk 1090 and provides the RAM 1020 or the hard disk drive 1040 with the program or data via the I/O chip 1070. The I/O chip 1070 connects the flexible disk 1090 and various I/O devices, for example, via a parallel port, a serial port, a keyboard port, a mouse port and the like.

The program provided to the information processor 400 is stored in a recording medium such as the flexible disk 1090, the CD-ROM 1095, or an IC card and is provided by a user. The program is read from the recording medium via the I/O chip 1070 and/or the I/O controller 1084 and installed in the information processor 400 before it is executed. The operations that the program causes the information processor 400 or the like to perform are the same as the operations of the application server apparatus 30 described with reference to FIG. 1 to FIG. 10, and therefore the description is omitted here.

The above programs may also be stored in an external storage medium. The storage medium that is usable is an optical recording medium such as a DVD or a PD, a magnet-optical recording medium such as an MD, a tape medium, or a semiconductor memory such as an IC card as well as the flexible disk 1090 and the CD-ROM 1095. In addition, it is possible to use a storage device, as a recording medium, such as a hard disk or a RAM provided in a server system connected to a private communication network or the Internet in order to provide the information processor 400 with the programs via the network.

While the present invention has been described hereinabove in conjunction with the preferred embodiments, it is to be understood that the technical scope of the present invention is not limited to the above described embodiments. It is apparent to those skilled in the art that various modifications or improvements may be made to the foregoing. It is apparent from the appended claims that the technical scope of the present invention may include the embodiments in which such modifications or improvements have been made.

DESCRIPTION OF SYMBOLS

10 Access control system
20 Client apparatus
30 Application server apparatus
35 Cache section
40 Database apparatus
45 Database
300 Executing section
310 Reference recording section
320 Request queue
330 Reply requesting section
340 Judging section
345 Correspondence recording section
350 Processing section
400 Information processor
500 Verify request

The invention claimed is:

1. A system for controlling transaction commit verification access to a database which stores values of a plurality of keys associated with the respective keys, comprising:
a CPU;
an executing section which executes a plurality of transactions on the database;
a reference recording section which acquires and records, according to the execution of each of the plurality of transactions, a referenced value which is a value of a key referenced in the executed transaction from the database;
a request queue for storing a plurality of commit requests for the plurality of transactions;
a reply requesting section which generates one request to the database for the plurality of commit requests of the plurality of transactions in the request queue, requesting a reply of a resultant table including an arrangement of judgment results for the plurality of transactions obtained by judging whether the value of the key stored in the database is maintained as the referenced value without change made by another transaction for each of the plurality of transactions;
a judging section which judges that a transaction is successful on condition that the value of the key referenced in the transaction is maintained as the referenced value without change made by another transaction, with respect to each of the plurality of transactions, and returns the resultant table having judgment results for each of the plurality of transactions; and
a processing section which commits the transactions judged to be successful and does a rollback of the transactions judged to be unsuccessful.

2. The system according to claim 1, wherein the reply requesting section requests the reply of the resultant table including an arrangement of judgment results, each of which is obtained by judging whether the value of the key matches the referenced value for each key, including identification information of transactions that reference the keys.

3. The system according to claim 2, wherein the reply requesting section joins and sends the requests for sending back the judgment results of the plurality of keys by using a command for joining and sending back the results of a plurality of requests into a single table.

4. The system according to claim 3, wherein the reply requesting section joins and sends SQL SELECT commands for sending back the judgment results of the plurality of keys by using a UNION ALL command for joining and sending back the results of a plurality of requests.

5. The system according to claim 2, wherein:
the reply requesting section requests a reply of the resultant table assuming that the request for the judgment results is a request for counting and sending back the number of lines in which the value of the key matches the referenced value with respect to each of the keys; and
the judging section judges a transaction that referenced a key where the number of lines matching the referenced value is one to be successful in the resultant table.

6. The system according to claim 1, further comprising a correspondence recording section, wherein:
the reply requesting section requests a reply of the resultant table including the arrangement of the judgment results with being associated with a plurality of pieces of predetermined identification information, respectively;
the correspondence recording section records correspondence information indicating which transaction referenced the value of the key corresponding to each of the plurality of pieces of identification information with respect to the requested resultant table; and
the judging section judges whether each transaction is successful or unsuccessful with each of the judgment results on the resultant table assumed as the judgment result of the transaction associated in this correspondence information with the identification information associated with the judgment result.

7. The system according to claim 6, wherein the reply requesting section sends, as a request for a reply of the resultant table, a prepared statement including a plurality of pieces of predetermined identification information in commands with the key ID and the value of the key as parameters.

8. A system comprising:
a client apparatus;
an application server apparatus; and
a database server apparatus,
wherein the client apparatus sends a request for a transaction to the database server apparatus and/or a commit request to the application server apparatus;
wherein the database server apparatus has a database that stores values of a plurality of keys with being associated with the respective keys; and
wherein the application server apparatus includes:
an executing section which executes a plurality of transactions on the database in response to the request for the transaction received from the client apparatus;
a reference recording section which acquires and records, according to the execution of each of the transactions, a referenced value which is a value of a key referenced in the executed transaction from the database;
a request queue for storing a plurality of commit requests for the plurality of transactions;
a reply requesting section which generates one request to the database for the plurality of commit requests of the plurality of transactions in the request queue, requesting a reply of a resultant table including an arrangement of judgment results for the plurality of transactions obtained by judging whether the value of the key stored in the database is maintained as the referenced value without change made by another transaction for each of the plurality of transactions;

a judging section which judges that a transaction is successful on condition that the value of the key referenced in the transaction is maintained as the referenced value without change made by another transaction, with respect to each of the plurality of transactions, and returns the resultant table having judgment results for each of the plurality of transactions; and a processing section which commits the transactions judged to be successful and does a rollback of the transactions judged to be unsuccessful.

9. The system according to claim 8, having a plurality of the client apparatuses, wherein the executing section performs the plurality of transactions according to the request of the transactions received from the plurality of client apparatuses;

wherein the reply requesting section requests a reply of the resultant table according to the commit request received from the plurality of client apparatuses and stored in the request queue; and wherein the processing section notifies the client apparatuses that requested the transactions of completed commit or rollback with respect to committed or rolled back transactions.

10. A method of transaction commit verification access control to a database, wherein the database stores values of a plurality of keys associated with the respective keys, the method comprising the steps of:

executing a plurality of transactions on the database;

acquiring and recording, according to the execution of each of the transactions, a referenced value which is a value of a key referenced in the executed transaction from the database;

storing a plurality of commit requests for the plurality of transactions;

generating one request to the database for the plurality of commit requests of the plurality of transactions in a request queue, requesting a reply of a resultant table including an arrangement of judgment results for the plurality of transactions obtained by judging whether the value of the key stored in the database is maintained as the referenced value without change made by another transaction for each of the plurality of transactions;

judging that a transaction is successful on condition that the value of the key referenced in the transaction is maintained as the referenced value without change made by another transaction, with respect to each of the plurality of transactions, and returning the resultant table having judgment results for each of the plurality of transactions; and committing the transactions judged to be successful and making a rollback of the transactions judged to be unsuccessful.

11. A program storage device storing a program which causes an information processor to function as a system for controlling transaction commit verification access to a database, wherein the database stores values of a plurality of keys associated with the respective keys, the program causing the information processor to function as:

an executing section which executes a plurality of transactions on the database;

a reference recording section which acquires and records, according to the execution of each of the transactions, a referenced value which is a value of a key referenced in the executed transaction from the database;

a request queue for storing a plurality of commit requests for the plurality of transactions;

a reply requesting section which generates one request to the database for the plurality of commit requests of the plurality of transactions in the request queue, requesting a reply of a resultant table including an arrangement of judgment results for the plurality of transactions obtained by judging whether the value of the key stored in the database is maintained as the referenced value without change made by another transaction for each of the plurality of transactions;

a judging section which judges that a transaction is successful on condition that the value of the key referenced in the transaction is maintained as the referenced value without change made by another transaction, with respect to each of the plurality of transactions, and returns the resultant table having judgment results for each of the plurality of transactions; and a processing section which commits the transactions judged to be successful and does a rollback of the transactions judged to be unsuccessful.

12. The system of claim 1 wherein the reply requesting section requests the resultant table when a predetermined event occurs at the request queue.

13. The system of claim 12 wherein the predetermined event comprises a number of the plurality of stored commit requests reaching a predetermined threshold number.

14. The system of claim 12 wherein the predetermined event comprises expiration of a preset time interval.

15. The system of claim 8 wherein the reply requesting section requests the resultant table when a predetermined event occurs at the request queue.

16. The system of claim 15 wherein the predetermined event comprises a number of the plurality of stored commit requests reaching a predetermined threshold number.

17. The system of claim 15 wherein the predetermined event comprises expiration of a preset time interval.

18. The method of claim 10 wherein the requesting of a reply of a resultant table is performed upon detection of of a predetermined event at the request queue.

19. The method of claim 18 wherein detection of a predetermined event comprises comparing a number of the plurality of stored commit requests to a predetermined threshold number and requesting a reply when the number of the plurality of stored commit requests reaches the predetermined threshold number.

20. The method of claim 18 wherein detection of a predetermined event comprises setting a timer and requesting a reply upon expiration of a preset time interval.

* * * * *